United States Patent [19]

Hart et al.

[11] Patent Number: 5,456,730
[45] Date of Patent: Oct. 10, 1995

[54] POLYMERIC ADDITIVES

[75] Inventors: Richard J. Hart, Didcot; Tuncel Ibrahim, Abingdon; Graham Jackson, Reading, all of United Kingdom

[73] Assignee: Exxon Chemical Patents Inc., Linden, N.J.

[21] Appl. No.: 107,858

[22] PCT Filed: Nov. 4, 1993

[86] PCT No.: PCT/EP92/00406

§ 371 Date: Aug. 27, 1993

§ 102(e) Date: Aug. 27, 1993

[87] PCT Pub. No.: WO92/15623

PCT Pub. Date: Sep. 17, 1992

[30] Foreign Application Priority Data

Feb. 27, 1991 [GB] United Kingdom ............... 9104138

[51] Int. Cl.⁶ .................... C10L 1/18; C10L 1/22; C08F 8/30
[52] U.S. Cl. .................. 44/322; 44/324; 44/386; 44/412; 44/451
[58] Field of Search ............... 44/324, 322, 386, 44/412, 451

[56] References Cited

U.S. PATENT DOCUMENTS

| | | | |
|---|---|---|---|
| 2,378,466 | 6/1945 | Curme, Jr. | 44/324 |
| 3,048,479 | 8/1962 | Ilnyckyj et al. | 44/393 |
| 3,410,671 | 11/1968 | Le Suer | 44/324 |
| 3,449,437 | 6/1969 | Lee | 260/593 |
| 3,846,092 | 11/1974 | Pappas et al. | 44/62 |
| 3,861,916 | 1/1975 | Logue | 96/1.8 |
| 3,961,916 | 6/1976 | Ilnyckyj et al. | 44/393 |
| 4,261,703 | 4/1981 | Tack et al. | 44/62 |
| 4,406,665 | 9/1983 | Filbey | 44/324 |
| 4,420,311 | 12/1983 | Thomas | 44/53 |
| 4,491,455 | 1/1985 | Ishizaki et al. | 44/62 |
| 4,631,071 | 12/1986 | Axelrod et al. | 44/71 |
| 4,639,256 | 1/1987 | Axelrod et al. | 44/71 |

FOREIGN PATENT DOCUMENTS

| | | | |
|---|---|---|---|
| 0061895 | 10/1982 | European Pat. Off. | C10L 1/18 |
| 0080314 | 6/1983 | European Pat. Off. | |
| 0117108 | 8/1984 | European Pat. Off. | C10L 1/22 |
| 0153176 | 8/1985 | European Pat. Off. | C10L 1/18 |
| 0153177 | 8/1985 | European Pat. Off. | C10L 1/18 |
| 0261957 | 3/1988 | European Pat. Off. | C07C 143/53 |
| 0326356 | 8/1989 | European Pat. Off. | C10L 1/22 |
| 0327423 | 8/1989 | European Pat. Off. | C08G 63/76 |
| 2121807 | 1/1984 | United Kingdom | C08F 8/32 |

OTHER PUBLICATIONS

"New Laboratory Test for Predicting Low-temperature Operability of Diesel Fuels" *Journal of the Institute of Petroleum*, T. Coley, L. F. Rutishauser, and H. M. Ashton vol. 52, No. 510–Jun. 1966, pp. 173–185.

Primary Examiner—Jacqueline V. Howard
Attorney, Agent, or Firm—J. J. Mahon

[57] ABSTRACT

There are disclosed middle distillate fuel oil compositions containing an additive being a copolymer of Mn 200–50,000 having a polymethylene backbone which may be O or N substituted and having nitrate, peroxide, nitrite or nitrosocarbonate side chains.

3 Claims, 2 Drawing Sheets

POLYMERIC ADDITIVES

This invention relates to oil-soluble polymers and their use in oils as flow improvers or in middle distillate fuels as cetane improvers.

Cetane improvers are additives used to raise the cetane number of fuel. Many types of additive have been proposed and used to raise the octane number of Diesel fuel, examples of which include peroxides, nitrites, nitrates and nitrosocarbonates. Alkyl nitrates such as amyl nitrate, hexyl nitrate and mixed octyl nitrates have been used commercially for this purpose. The following patent specifications describe the use of nitrates for improving the cetane number of Diesel fuel: U.S. Pat. No. 4,420,311 and U.S. Pat. No. 4,406,665.

Flow improvers are additives used to improve the flow characteristics of middle distillate fuels at decreased temperatures where the fuels lose fluidity due to crystallisation of wax in the fuel into plate-like crystals that eventually form a spongy mass that entraps the fuel. The additives work by modifying the size of the wax crystals and reduce the adhesive forces between the wax and fuel in such a way as to improve the filterability of the fuel and permit it to remain fluid at a lower temperature. They are also known in the art. Examples include polymers that have a polymethylene backbone which is divided into segments by hydrocarbon or oxy-hydrocarbon side chains, by aliphatic or heterocyclic structures or by chlorine. Such polymers are described, for example in U.S. Pat. Nos. 3,048,479; 3,961,916 and 4,261,703.

It has now been found according to this invention that certain polymers can function both as cetane improvers and flow improvers in fuel oils and as flow improvers in lubricating oil and crude oil.

Thus, this invention, in a first aspect, is a composition comprising a major proportion of a fuel oil, lubricating oil or crude oil and a minor proportion of an additive comprising an oil-soluble polymer of number average molecular weight in the range of 200 to 50,000, the polymer having or including a polymer backbone carrying a plurality of the same or different functional groups that give rise to cetane improving properties in a fuel oil when the polymer is an additive therefor.

In another aspect, the invention is the use of the polymer of the first aspect of the invention as a cetane improver in a middle distillate fuel or as flow improver in a fuel oil, lubricating oil or crude oil.

In another aspect, the invention is a concentrate for adding to a fuel oil, lubricating oil or crude oil comprising the polymer of the first aspect of the invention in admixture with a liquid carrier therefor.

In another aspect, the invention is a method of operating a diesel engine which includes introducing to the engine as the fuel a composition comprising a major proportion of a middle distillate fuel and a minor proportion of a polymer of the first aspect of the invention.

In another aspect, the invention is an oil-soluble polymer of number average molecular weight in the range of 200 to 50,000 having or including a polymethylene backbone carrying a plurality of the same or different functional groups that give rise to cetane improving properties in a fuel oil when the polymer is an additive therefor, and groups of the formula R—CO—O— where R is a hydrocarbyl group having 1 to 28 carbon atoms.

The features of the invention will now be described in more detail as follows.

POLYMER

The polymer may, for example, be a homopolymer or a copolymer, where it may be a block copolymer or a random copolymer. The defined backbone according to this invention may constitute part only of the overall polymer backbone or may constitute substantially all of the polymer backbone. A preferred example of defined backbone is a polymethylene backbone which may optionally be interrupted by one or more hetero atoms such as oxygen or a group or groups containing one or more hetero atoms.

Examples of the functional groups are nitrate, peroxide, nitrite or nitrosocarbonate, such groups being precursor groups that initiate combustion in a fuel by generation of free radicals. Nitrate groups are preferred.

The functional groups are preferably bonded directly to atoms of the defined backbone of the polymer, for example, to carbon atoms of a polymethylene backbone where the defined backbone is polymethylene. However, the groups may, for example be bonded indirectly to atoms of the defined backbone such as via an alkylene that is optionally interrupted by one or more hetero atoms such as oxygen or nitrogen atoms, or by groups other than hydrocarbyl groups, or by both.

The defined backbone may carry groups additional to those mentioned above. Thus, atoms of the defined backbone such as carbon atoms may carry free hydroxyl groups which may enhance the performance of the polymer in the practice of this invention, or they may carry groups of the formula R—CO—O— where R is a hydrocarbyl group having from 1 to 28 carbon atoms, or both.

The groups which may be carried by the defined backbone such as by the carbon atoms of a polymethylene backbone are not necessarily limited to the groups specifically mentioned above.

In one embodiment, the polymer may be regarded as an ethylene copolymer having a polymethylene backbone divided into segments by nitrate group containing side chains and optionally other side chains such as hydrocarbon, oxyhydrocarbon, halogen, and hydroxy.

The number average molecular weight of the polymer is as measured by gel permeation chromatography (using polystyrene standards), often abbreviated to GPC, and is preferably in the range of 800 to 20,000, most preferably in the range of 1,000 to 6,000.

The polymer may, for example, be a totally or partially hydrolysed and then treated, e.g. nitrated, copolymer of a $C_2$ to $C_{20}$ alkene such as ethylene and an unsaturated ester monomer. Thus, control of the degree of hydrolysis influences the number of functional groups such as nitrate groups per molecule and hence the performance of the polymer in this invention.

The unsaturated ester monomer may, for example have the general formula

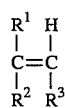

wherein $R^1$ is hydrogen or methyl; $R^2$ is a —$OOCR^4$ group wherein $R^4$ is hydrogen or a $C_1$ to $C_{28}$, more usually $C_1$ to $C_{16}$, and preferably a $C_1$ to $C_8$, straight or branched chain alkyl group; or $R^2$ is a —$COOR^4$ group wherein $R^4$ is as previously described and $R^3$ is hydrogen or —$COOR^4$ as previously defined. The monomer, when $R^1$ and $R^3$ are hydrogen and $R^2$ is —OOCR$^4$, includes vinyl alcohol esters of $C_1$ to $C_{29}$, more usually $C_1$ to $C_{17}$, monocarboxylic acid, and preferably $C_2$ to $C_5$ monocarboxylic acid. Examples of such esters include vinyl acetate, vinyl isobutyrate, vinyl laurate, vinyl myristate and vinyl palmitate, vinyl acetate being the preferred ester. When $R^2$ is —COOR$^4$ and $R^3$ is hydrogen, such esters include methyl acrylate, isobutyl acrylate, methyl methacrylate, lauryl acrylate, $C_{13}$ Oxo alcohol esters of methacrylic acid, etc. Examples of monomers where $R^1$ is hydrogen and either or both $R^2$ and $R^3$ are —COOR$^4$ groups, including mono and diesters of unsaturated dicarboxylic acids such as: mono $C_{13}$ Oxo fumarate, di-$C_{13}$ Oxo fumarate, di-isopropyl maleate, di-lauryl fumarate and ethyl methyl fumarate.

When the invention is the composition, method or the use, the polymer may, for example, be present in a concentration in the range of 0.001% to 5% (weight:weight) based on the oil, preferably 0.005% to 0.1% (weight:weight), most preferably 0.01 to 0.04% (weight:weight). When the invention is the concentrate, the polymer may, for example, be present in a concentration of greater than 3% (weight:weight), preferably in the range of 3% to 75% (weight:weight), more preferably 3 to 60%, most preferably 10 to 50%.

Examples of liquid carrier that may be used in the concentrate are organic solvents including hydrocarbon solvents, for example petroleum fractions such as naphtha, kerosene, and heater oil; aromatic hydrocarbons such as benzene, xylene and toluene; and paraffinic hydrocarbons such as hexane and pentane. The liquid carrier must, of course, be selected with regard to its compatibility with the fuel and with the additive.

Said polymer may, if desired, be used in combination with other additives such as those known in the art. It may, for example, be used in combination with one or more cetane improvers or one or more middle distillate flow improvers or both. Also, more than one said polymer may be used.

Examples of such cetane improvers are mixed octyl nitrates, peroxides, or other materials known in the art as cetane improvers in diesel fuel. Examples of such middle distillate flow improvers are condensates or addition products such as ethylene/vinyl ester copolymers; comb polymers such as fumarate/vinyl ester copolymers; monomeric polar compounds; hydrocarbon polymers; and polyoxyalkylene esters, ether/esters.

The addition products are formed by an addition reaction as such and the condensates by a condensation reaction comprising addition of one molecule to another with the elimination of a simple molecule such as water, ammonia or an alcohol. They include materials that are known in the art for improving the cold flow properties of oils. In this specification, reference to such products and condensates includes products and condensates that have been made by a process sequence including an addition or condensation reaction, for example an addition product or condensate that has been subjected to one or more subsequent processing steps.

Examples of addition products are one or more copolymers of ethylene and an unsaturated monomer of the general formula

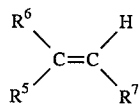

wherein $R^6$ is hydrogen or methyl, $R^5$ is a —OOCR$^8$ group wherein $R^8$ is a hydrogen formate or a $C_1$ to $C_{28}$, more usually $C_1$ to $C_{17}$, and preferably a $C_1$ to $C_8$, straight or branched chain alkyl group; or $R^5$ is a —COOR$^8$ group wherein $R^8$ is as previously described but is not hydrogen and $R^7$ is hydrogen or —COOR$^8$ as previously defined, and may include other comonomer(s) to give rise to, for example, terpolymers or tetrapolymers or higher, for example where the other comonomer is an isoolefin such as diisobutylene.

The monomer, when $R^6$ and $R^7$ are hydrogen and $R^5$ is —OOCR$^8$, includes vinyl alcohol esters of $C_1$ to $C_{29}$, more usually $C_1$ to $C_5$, mono-carboxylic acid, and preferably $C_2$ to $C_{29}$, more usually $C_1$ to $C_5$ mono-carboxylic acid, and preferably $C_2$ to $C_5$ mono-carboxylic acid. Examples of vinyl esters which may be copolymerised with ethylene include vinyl acetate, vinyl propionate and vinyl butyrate or isobutyrate, vinyl acetate being preferred. It is preferred that these copolymers have a number average molecular weight as measured by vapour phase osometry of 1,000 to 10,000, preferably 1,000 to 5,000.

Examples of condensates are as follows.

An oil-soluble polar nitrogen compound comprising one or more of the compounds (i) to (iii):

(i) an mine salt and/or amide formed by reacting at least one molar proportion of a hydrocarbyl substituted amine with a molar proportion of a hydrocarbyl acid having 1 to 4 carboxylic acid groups or their anhydrides, or a condensate such as described in EP-A-327,423;

(ii) a chemical compound comprising or including a cyclic ring system, the compound carrying at least two substituents of the general formula (I) below on the ring system

where A is an aliphatic hydrocarbyl group that is optionally interrupted by one or more hetero atoms and that is straight chain or branched, and $R^9$ and $R^{10}$ are the same or different and each is independently a hydrocarbyl group containing 9 to 40 carbon atoms optionally interrupted by one or more hetero atoms, the substituents being the same or different and the compound optionally being in the form of a salt thereof; and (iii) a condensate of a long chain primary or secondary amine with a carboxylic acid containing polymer, for example as described in GB-A-2,121,807, FR-A-2,592,387 and DE-A-3,941,561.

In (i), (ii) and (iii) above, the following is to be noted.

(i) Ester/amides may be used containing 30 to 300, preferably 50 to 150 total carbon atoms. These nitrogen comopunds are described in U.S. Pat. No. 4,211,534. Suitable amines are usually long chain $C_{12}$–$C_{40}$ primary, secondary, tertiary or quaternary amines or mixtures thereof but shorter chain amines may be used provided the resulting nitrogen compound is oil soluble and therefore normally containing about 30 to 300 total carbon atoms. The nitrogen compound preferably contains at least one straight chain $C_8$ to $C_{40}$, preferably $C_{14}$ to $C_{24}$ alkyl segment.

Suitable amines include primary, secondary, tertiary or quaternary, but preferably are secondary. Tertiary and quaternary amines can only form amine salts. Examples of amines include tetradecyl amine, cocoamine, and hydrogenated tallow amine. Examples of secondary amines include dioctacedyl amine and methyl-behenyl. Amine mixtures are also suitable such as those derived from natural materials. A preferred amine is a secondary hydrogenated tallow amine of the formula HNR$^{11}$R$^{12}$ wherein R$^{11}$ and R$^{12}$ are alkyl groups derived from hydrogenated tallow fat composed of approximately 4% $C_{14}$, 31% $C_{16}$, 59% $C_{18}$.

Examples of suitable carboxylic acids and their anhydrides for preparing the nitrogen compounds include cyclohexane, 1,2 dicarboxylic acid, cyclohexene 1,2 dicarboxylic acid, cyclopentane 1,2 dicarboxylic acid, naphthalene dicarboxylic acid and the like. Generally, these acids have about 5-13 carbon atoms in the cyclic moiety. Preferred acids useful in the present invention are benzene dicarboxylic acids such as phthalic acid, isophthalic acid, and terephthalic acid. Phthalic acid or its anhydride is particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

(ii) Preferably, A has from 1 to 20 carbon atoms and is preferably a methylene or polymethylene group.

"Hydrocarbyl" in this specification means an organic moiety composed of hydrogen and carbon which, unless the context states otherwise, may be aliphatic, including alicyclic; aromatic; or any combination thereof. It may be substituted or unsubstituted alkyl, aryl or aralkyl and may optionally contain unsaturation. Examples where it is substituted are oxy-, halogeno- and hydroxy-hydrocarbyl.

The cyclic ring system may include homocyclic, heterocyclic, or fused polycyclic assemblies, or a system where two or more such cyclic assemblies are joined to one another and in which the cyclic assemblies may be the same or different. Where there are two or more such cyclic assemblies, the substituents of the general formula (I) may be on the same or different assemblies, preferably on the same assembly. Preferably, the or each cyclic assembly is aromatic, more preferably a benzene ring. Most preferably, the cyclic ring system is a single benzene ring when it is preferred that the substituents are in the ortho or meta positions, which benzene ring may be optionally further substituted.

The ring atoms in the cyclic assembly or assemblies are preferably carbon atoms but may for example include one or more ring N, S or O atom, in which case or cases the compound is a heterocyclic compound.

Examples of such polycyclic assemblies include (a) condensed benzene structures such as naphthalene, anthracene, phenanthrene, and pyrene;

(b) condensed ring structures where none of or not all of the rings are benzene such as azulene, indene, hydroindene, fluorene, and diphenylene;

(c) rings joined "end-on" such as diphenyl;

(d) heterocyclic compounds such as quinoline, indole, 2:3 dihydroindole, benzofuran, coumaxin, isocoumarin, benzothiophen, carbazole and thiodiphenylamine;

(e) non-aromatic or partially saturated ting systems such as decalin (i.e. decahydronaphthalene), a-pinene, cardinene, and bornylene; and (f) three-dimensional structures such as norbornene, bicycloheptane (i.e. norbornane), bicyclooctane, and bicyclooctene.

Each hydrocarbyl group constituting $R^9$ and $R^{10}$ may for example be an alkyl or alkylene group or a mono- or poly-alkoxyalkyl group. Preferably, each hydrocarbyl group is a straight chain alkyl group. The number of carbon atoms in each hydrocarbyl group is preferably 16 to 40, more preferably 16 to 24.

Also, it is preferred that the cyclic system is substituted with two only substituents of the general formula (I) and that A is a methylene group.

Examples of salts of the chemical compounds are the acetate and the hydrochloride.

The compounds may conveniently be made by reducing the corresponding amide which may be made by reacting a secondary amine with the appropriate acid chloride.

(iii) Esters of telomer acid and alkanoloamines such as described in U.S. Pat. No. 4,639,256; the reaction product of an amine containing branched caxboxylic acid ester, an epoxide and a mono-carboxylic acid polyester such as described in U.S. Pat. No. 4,631,071.

Further examples of condensates are the following, which are co-additives for improving the cold flow properties of distillate fuels. Examples of such co-additives are as follows:

Comb Polymers

Examples are those having the general formula

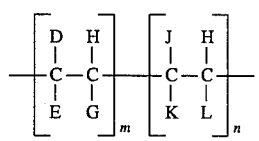

where $D=R^{13}$, $CO.OR^{13}$, $OCO.R^{13}$, $R^{14}CO.OR^{13}$ or $OR^{13}$ $E=H$ or $CH_3$ or $D$ or $R^{14}$ $G=H$, or $D$ $m=1.0$ (homopolymer) to 0.4 (mole ratio)

$J=H$, $R^{14}$, Aryl or Heterocyclic group, or $R^{14}CO.OR^{13}$ $K=H$, $CO.OR^{14}$, $OCO.R^{14}$, $OR^{14}$ or $CO_2H$ $L=H$, $R^{14}$, $CO.OR^{14}$, $OCO.R^{14}$, Aryl or $CO_2H$ $n=0.0$ to 0.6 (mole ratio)

$R^{13} \geq C_{10}$ $R^{14} \geq C_1$

Another monomer may be terpolymerized if necessary.

Examples of suitable comb polymers are fumarate/vinyl acetate copolymers, particularly those described in European Patent Applications 0153176 and 0153177; esterified olefin/maleic anhydride copolymers; polymers and copolymers of alpha olefin/maleic anhydride copolymers; polymers and copolymers of alpha olefins; esterified copolymers of styrene and maleic anhydride; and polymers of alkyl esters of itaconic acid or citraconic acid such as those where the alkyl groups have from 16 to 18 carbon atoms and the polymer has a number average molecular weight of from 1,000 to 20,000.

Polyoxyalkylene Compounds

Examples are polyoxyalkylene esters, ethers, ester/ethers and mixtures thereof, particularly those containing at least one, preferably at least two $C_{10}$ to $C_{30}$ linear saturated alkyl groups and a polyoxyalkylene glycol group of molecular weight 100 to 5,000 preferably 200 to 5,000, the alkyl group in said polyoxyalkylene glycol containing from 1 to 4 carbon atoms. These materials form the subject of European Patent Publication 0 061 895 A2. Other such additives are described in U.S. Pat. No. 4,491,455.

The preferred esters, ethers or ester/ethers which may be used may be structurally depicted by the formula $R^{15}$—$O(A^1)$—$O$—$R^{16}$ where $R^{15}$ and $R^{16}$ are the same or different and may be

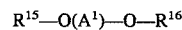

(a)n-alkyl

-continued (b) n-alkyl-$\overset{\overset{O}{\|}}{C}$ (c) n-alkyl-$O-\overset{\overset{O}{\|}}{C}-(CH_2)_n-$ (d) n-alkyl-$O-\overset{\overset{O}{\|}}{C}-(CH_2)_n-\overset{\overset{O}{\|}}{C}-$ the alkyl group being linear and saturated and containing 10 to 30 carbon atoms, and $A^1$ represents the polyalkylene segment of the glycol in which the alkylene group has 1 to 4 carbon atoms, such as polyoxymethylene, polyoxyethylene or polyoxytrimethylene moiety which is substantially linear; some degree of branching with lower alkyl side chains (such as in polyoxypropylene glycol) may be tolerated but it is preferred that the glycol should be substantially linear. $A^1$ may also contain nitrogen.

Suitable glycols generally are substantially linear polyethylene glycols (PEG) and polypropylene glycols (PPG) having a molecular weight of about 100 to 5,000, preferably about 200 to 2,000. Esters are preferred and fatty acids containing from 10-30 carbon atoms am useful for reacting with the glycols to form the ester additives, it being preferred to use a $C_{18}$-$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates when minor amounts of monoethers and monoesters (which are often formed in the manufacturing process) may also be present. It is important for additive performance that a major amount of the dialkyl compound is present. In particular, stearic or behenic diesters of polyethylene glycol, polypropylene glycol or polyethylene/polypropylene glycol mixtures are preferred.

Examples of other compounds in this general category are those described in Japanese Patent Publication Nos 2-51477 and 3-34790 (Sanyo), and EP-A-117,108 and EP-A-326,356 (NOF).

Hydrocarbon Polymers

Examples are those represented by the following general formula

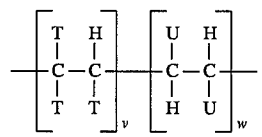

where

T=H or alkyl

U=H, T or Aryl v=1.0 to 0.0 (mole ratio)

w=0.0 to 1.0 (mole ratio)

These polymers may be made directly from ethylenically unsaturated monomers or indirectly by hydrogenating the polymer made from monomers such as isoprene, butadiene etc.

A particularly preferred hydrocarbon polymer is a copolymer of ethylene and propylene having an ethylene content preferably between 20 and 60% (w/w) and is commonly made via homogeneous catalysts.

Sulphur Carboxy Compounds

Examples are those described in EP-A-0261957 which describes the use of compounds of the general formula

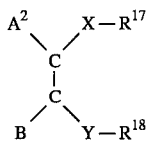

in which

—Y—$R^{18}$ is $SO_3(-)(+)NR_3^{19}R^{18}$, —$SO_3(-)(+)HNR_2^{19}R^{18}$,

—$SO_3(-)(+)H_2NR^{19}R^{18}$, —$SO_3(-)(+)H_3NR^{18}$,

—$SO_2NR^{19}R^{18}$ or —$SO_3R^{18}$;

—X—$R^{17}$ is —Y—$R^{18}$ or —$CONR^{19}R^{17}$, $CO_2(-)(+)NR_3^{19}R^{17}$, —$CO_2(-)(+)HNR_2^{19}R^{17}$,

—$R^{20}$—$COOR^{17}$, —$NR^{19}COR^{17}$,

—$R^{20}OR^{17}$, —$R^{20}OCOR^{17}$, —$R^{20},R^{17}$,

—$N(COR^{19})R^{17}$ or $Z(-)(+)NR_3^{19}R^{17}$;

—$Z(-)$ is $SO_3(-)$ or —$CO_2(-)$;

$R^{17}$ and $R^{18}$ are alkyl, alkoxy alkyl or polyalkoxy alkyl containing at least 10 carbon atoms in the main chain;

$R^{19}$ is hydrocarbyl and each $R^{19}$ may be the same or different and $R^{20}$ is nothing or is $C_1$ to $C_5$ alkylene and in

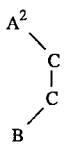

the carbon-carbon (C—C) bond is either a) ethylenically unsaturated when $A^2$ and B may be alkyl, alkenyl or substituted hydrocarbyl groups or b) part of a cyclic structure which may be aromatic, polynuclear aromatic or cyclo-aliphatic, it is preferred that X—$R^{17}$ and Y—$R^{18}$ between them contain at least three alkyl, alkoxyalkyl or polyalkoxyalkyl groups.

Multicomponent additive systems may be used and the ratios of additives to be used will depend on the fuel to be treated.

PREPARATION OF POLYMER

Exemplary polymers for use in the invention may conveniently be prepared, for example, by a two-step process: hydrolysis of an ethylene/vinyl acetate copolymer to generate hydroxyl groups followed by conversion, e.g. by nitration, of some or all of the hydroxyl groups to the functional group. Hydrolysis may be done by methods known in the art such as alcoholysis or saponification.

Hydrolysis of a copolymer of ethylene and a vinyl ester of a lower fatty acid to give a product that improves the pour and flowability properties of hydrocarbon fuels is described in U.S. Pat. No. 3,846,092. The hydrolysis converts some or all of the alkyanoyl groups of the copolymer to hydroxy groups, the degree of hydrolysis being influenced inter alia by the reaction conditions of the hydrolysis.

Conversion to the functional groups may be done by methods known in the art such as treatment with concentrated nitric acid to convert some or all of the hydroxy groups to nitrate groups.

Nitration of hydroxyl groups in polyvinyl alcohol to give polyvinyl nitrate is described in a paper by S Akiyama, N Inato and Kaneko entitled "A method for Synthesis of Polyvinyl Nitrate from Polyvinyl Alcohol" (Publication source: Korbunshi Kagaku 26, 529 (1969). The degree of conversion of hydroxyl groups to nitrate groups may be controlled to some extent by the reaction conditions of the nitration.

One method of making the polymers included in this invention thus comprises in general terms the steps of:

(a) hydrolysing a copolymer of the following components
   (A) an alkene having from 2 to 20 carbon atoms, and
   (B) a vinyl ester of formula $RCOOCH=CH_2$ where R is a hydrocarbyl group thereby to hydrolyse some or all of the RCOO— groups in the comonomer to hydroxyl groups, and
(b) Converting, e.g. by nitrating some or all of the hydroxyl groups thereby formed to the functional group.

An example of the preparation of a nitrated ethylene vinyl acetate copolymer where the nitrate group is bonded indirectly to the copolymer, i.e. via a connecting group is described in JP-A-57058886.

OIL

The oil may be a crude oil, i.e. oil obtained directly from drilling and before refining, the compounds of this invention being suitable for use as flow improvers or dewaxing aids therein.

The oil may be a lubricating oil which may be an animal, vegetable or mineral oil, such as petroleum oil fractions ranging from naphthas or spindle oil to SAE 30, 40 or 50 lubricating oil grades, castor oil, fish oils or oxidised mineral oil. Such an oil may contain additives depending on its intended use; examples are viscosity index improvers such as ethylene-propylene copolymers, succinic acid based dispersants, metal containing dispersant additives and zinc dialkyldithiophosphate antiwear additives. The compounds of this invention may be suitable for use in lubricating oils as flow improvers, pour point depressants or dewaxing aids.

The oil may be fuel oil suitably a middle distillate fuel oil, such oils being fuels obtained in refining crude oil as the fraction between the lighter gasoline fraction and the heavy fuel oil fraction. They contain a spread of hydrocarbons boiling over a temperature range, including n-alkanes which precipitate as wax as the fuel cools. They may be characterised by the temperatures at which various percentages of the fuel have vaporised and by their Cloud Point and CFPP (Cold Filter Plugging Point), the Cloud Point being the temperature at which wax starts to appear as the fuel cools and the CFPP being the temperature at which the presence of wax in the fuel prevents the fuel from passing through certain standard filters as specified by the IP 309 method.

Such distillate fuel oils generally boil within the range of about 110° C. to about 500° C., e.g. 150° to about 400° C. The fuel oil can comprise atmospheric distillate or vacuum distillate, or cracked gas oil or a blend in any proportion of straight run and thermally and/or catalytically cracked distillates, or may be a vegetable oil. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. The above-mentioned low temperature flow problem is most usually encountered with diesel fuels and with heating oils.

The oil may include artificial or synthetic fuels which may be substitutes for natural fuels.

EXAMPLES

Figure 1:
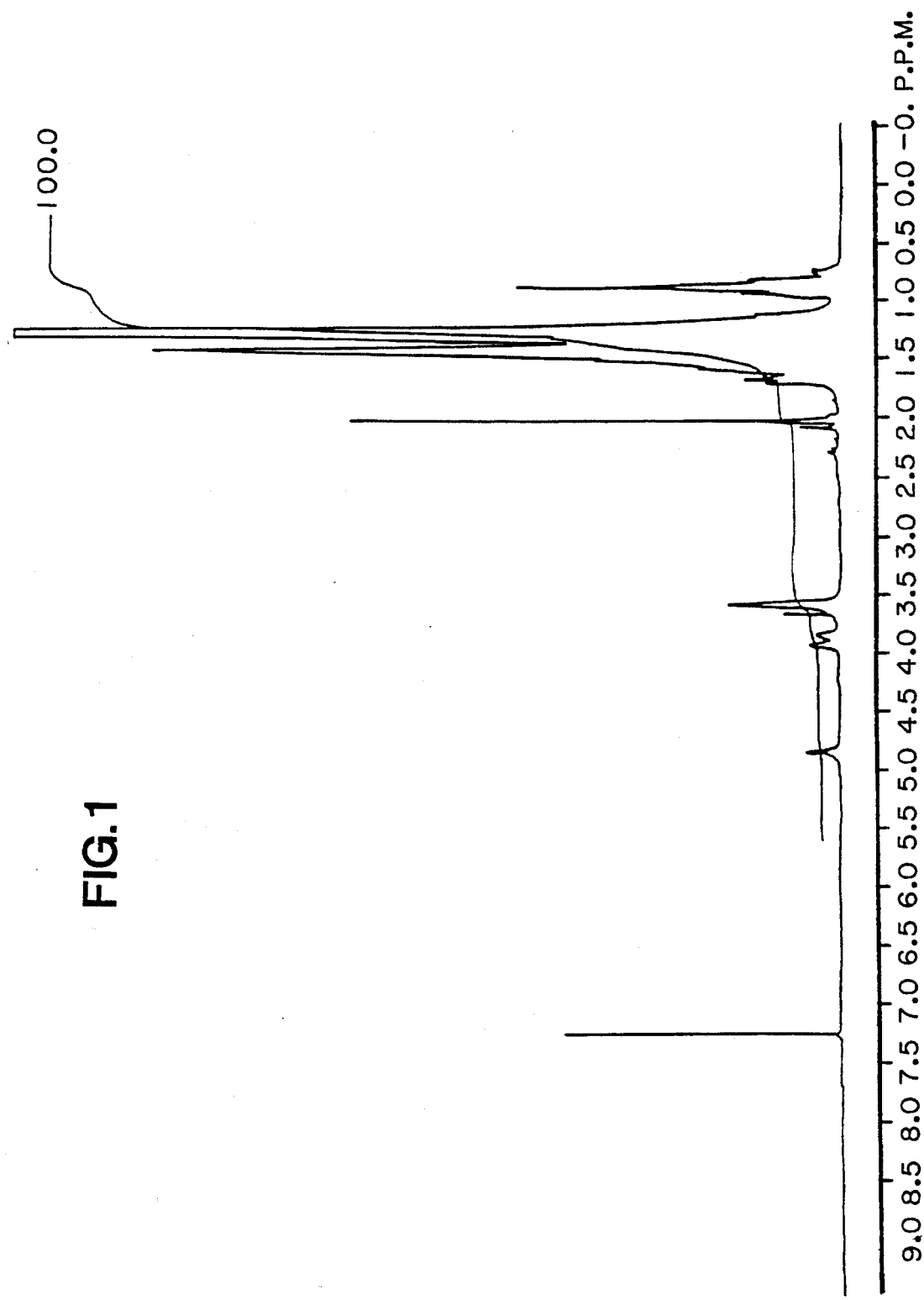
FIG. 1 is a proton NMR trace of the intermediate product prepared in Example 1 and FIG. 2 is a proton NMR trace of the final product of Example 1.
Figure 2:
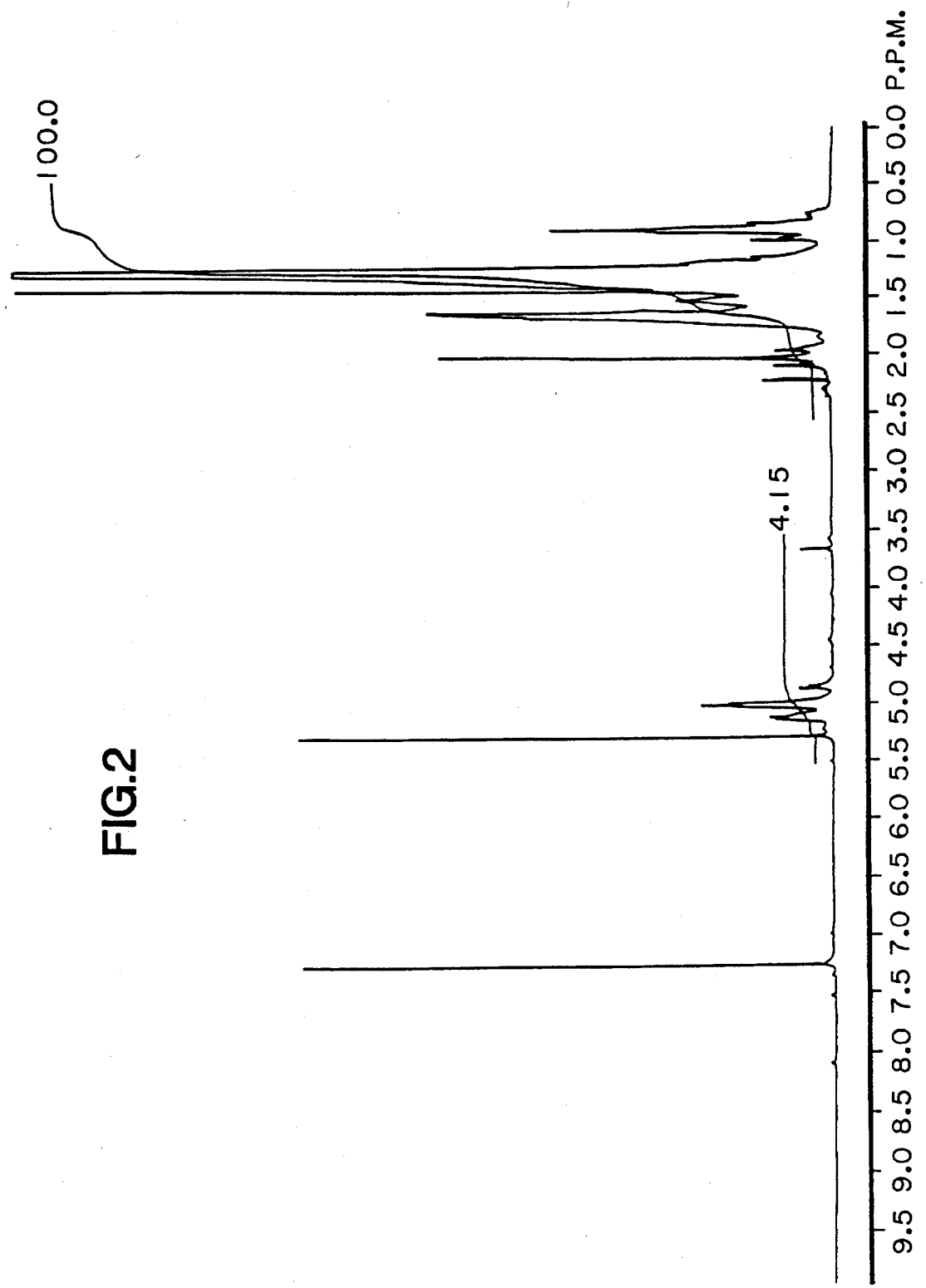

The following examples illustrate the invention where reference will be made to the accompanying drawings in which FIG. 1 is a proton NMR trace of the intermediate product of Example 1 below and FIG. 2 is a proton NMR trace of the final product of Example 1 below.

(i) Preparation of Polymer

Example 1

An ethylene/vinyl acetate copolymer was warmed to 90° C. for 1 hour with sodium methoxide in n-butanol. This gave a fully hydrolysed product which was then acidified with aqueous acid and washed with water. The resulting precipitate of hydrolysed ethylene/vinyl acetate copolymer was filtered off and dried, the hydrolysed product being characterised by the NMR trace shown in FIG. 1.

The precipitate (10 parts) was dissolved in a mixture of cyclohexane (20 parts) and acetic acid (10 parts) and the resulting solution added dropwise to a nitrating medium at 5° C. with constant vigorous stirring. The nitrating medium comprised a mixture of fuming nitric acid (6 parts), acetic acid (8 parts) and acetic anhydride (8 parts). After 1 hour the resulting mixture was poured onto an ice-water slurry giving rise to a sticky solid form from which the water was decanted. The solid was then dissolved in dichloromethane and washed with water. Sodium sulphate was added to dry the dichloromethane and the mixture filtered and evaporated to leave a fully nitrated polymer product.

The ethylene/vinyl acetate copolymer had a number average molecular weight as measured by GPC of about 3000 and contained about 33% by weight vinyl acetate. The above product also contained about 33% by weight of vinyl nitrate equivalent. The product is characterised by the NMR trace shown in FIG. 2.

Example 2

The procedure of Example 1 was repeated with the exception that the nitration reaction was performed for a shorter period than used in Example 1. The product contained 5% by weight of vinyl nitrate equivalent showing that it had only been partially nitrated. Also, NMR results indicated the presence of unnitrated hydroxyl groups.

Example 3

The procedure of Example 1 was repeated with the exception that the ethylene/vinyl acetate copolymer used had a number average molecular weight as measured by GPC of about 5000 and contained about 13% by weight vinyl acetate.

The nitrated product contained about 11% by weight of vinyl nitrate equivalent showing that it had been almost completely nitrated.

(ii) Tests on Polymer Products
(A) Cetaine Increase

The cetane increase caused by the products of each of the Examples 1 and 2 above was measured in comparison with that caused by a commercial cetane improver, mixed octyl nitrates, using a standard octane engine. The tests were carried out in two different fuels, the results being summarised below.

| FUEL | ADDITIVE (ppm) | CETANE NO (Average) |
| --- | --- | --- |
| Thames Matex Diesel Fuel | — | 49.5 |
| | Octyl Nitrates (500) | 51.8 |
| | 1 (765) | 51.5 |
| US Diesel | — | 43.1 |
| | Octryl Nitrate (500) | 45.2 |
| | 2 (5035) | 44.1* |

*= single result only
1, 2 = products of Examples 1 and 2 respectively

The test results show that the additives of the invention increased the cetane number of the test fuel to values approaching those of the commercial additive tested.

(B) Flow Improver Performance
First Series of Tests

The following two tests were carried out on a base middle distillate fuel (identified as FI), the same fuel containing a known ethylene/vinyl/acetate flow improver, and the same fuel containing each of the products of Examples 1 and 2 above.

Programmed Cooling Test (XPCT)

The test fuel (about 300 ml) was cooled at a rate of 1° C. per hour to a target temperature which was well below the cloud point of the fuel. Satisfactory operability is indicated if 200 ml of the fuel can be filtered in under 10 seconds through a given mesh size under a vacuum of 500 mm Hg.

Cold Flow Plugging Point Test (CFPPT)

The procedure is described in detail in "Journal of the Institute of Petroleum", Volume 52, Number 510, June 1966 pp 173–185. In brief, a 40 ml sample of the oil to be tested is cooled in a bath to about −34° C. Periodically (at each one degree Centigrade drop in temperature starting from at least 2° C. above the cloud point) the cooled oil is tested for its ability to flow through a fine screen in a prescribed time period using a test device which is a pipette to whose lower end is attached an inverted funnel which is positioned below the surface of the oil to be tested. Stretched across the mouth of the funnel is a 350 mesh green having an area of about 12 mm diameter. The periodic tests are each initiated by applying a vacuum to the upper end of the pipette whereby oil is drawn through the screen up into the pipette to a mark indicating 20 ml of oil. The test is repeated with each one degree drop in temperature until the oil fails to fill the pipette within 60 seconds. The results of the test are reported as the temperature (the plugging point) in °C. at which the oil fails to fill the pipette in one minute.

The fuel (FI) was a typical European Diesel fuel having the following characteristics.

| Aniline Point | 64.8 |
| --- | --- |
| Density | 0.8372 |

-continued

| Viscosity | |
| --- | --- |
| at 20° C. | 3.76 cSt |
| at 40° C. | 2.46 cSt |
| Cloud Point | 0° C. |
| CFPP | −5° C. |
| Hydrogen Content | 13.29% |
| Percent Sulphur | 0.17 |
| Percent Wax at −20° C. | 0 |
| Flash Point | 62° C. |
| Initial Boiling Point | 153° C. |
| Final Boiling Point | 373° C. |

The known ethylene/vinyl acetate copolymer (Additive A) was a mixture of first and second copolymers in the weight:weight ratio of 93:7, the first copolymer having 36.5% by weight of vinyl acetate and an Mn of 2580 and the second copolymer having 13.5% by weight of vinyl acetate and an Mn of 5000.

The result of the tests are shown in the table below

| Additive | Additive Concentration in Base Fuel (ppm) | PCT (Mesh Size) | CFPP (°C.) |
| --- | --- | --- | --- |
| BASE FUEL ALONE | 0 | 30 | −11 |
| A | 100 | 100 | |
| | 200 | VW | |
| | 400 | 200 | |
| 1 | 100 | 100 | −13 |
| | 200 | 200 | −13 |
| | 400 | 80 | −13 |
| | 800 | — | −13 |
| 2 | 100 | 40 | — |
| | 200 | 150 | −12 |
| | 400 | 200 | −15 |
| | 800 | — | −18 |

(1, 2 = products of Examples 1 and 2 respectively)

VW means a simulation of the VW fuel screening mesh (a Volkswagen Tank filter, part No. KA/4-270/65.431-201-511), which has triangular holes and which is intermediate in size between 250 mesh and 350 mesh.

The results show that the additives of the invention (1 and 2) enhanced cold flow performance to an extent comparable to that of the known additive (A) as evidenced by the PCT results above, and also have CFPP activity as evidenced by the above results.

Second Series of Tests

CFPP tests, as described above were carried out on two further base middle distillate fuels (identified as F2 and F3) on the same fuels containing a known ethylene/vinyl acetate flow improver, and on the same fuels containing each of the products of Examples 1, 2 and 3.

The fuels (F2 and F3) had the following characteristics.

| Fuel Characteristics | | |
| --- | --- | --- |
| | F2 | F3 |
| Cloud Point °C. | −18 | −13 |
| Density | 0.8510 | 0.8554 |
| WAT °C. | −18.1 | −14.5 |
| Wax Content 10° C. below WAT, mass % | 2.5 | 2.7 |
| D-86, °C. | | |
| IBP | 196 | 175 |

-continued

| Fuel Characteristics | | |
|---|---|---|
| | F2 | F3 |
| 5% | 224 | 216 |
| 10% | 231 | 227 |
| 20% | 241 | 239 |
| 30% | 248 | 250 |
| 40% | 255 | 259 |
| 50% | 263 | 269 |
| 60% | 272 | 279 |
| 70% | 282 | 289 |
| 80% | 293 | 301 |
| 90% | 308 | 317 |
| 95% | 321 | 329 |
| FBP | 340 | 348 |
| 90–20% | 67 | 78 |
| FBP-90 | 32 | 31 |
| Highest N-Paraffin (>100 ppm) | C26 | C26/27 |

The known ethylene/vinyl acetate copolymer was the same as Additive A referred to and as used in the first series of tests herein and is referred to as such in the test results which are shown in the table below.

| Additive | Additive Concentration in Base Fuel (ppm) | CFPP (°C.) Fuel | |
|---|---|---|---|
| | | F2 | F3 |
| BASE FUEL | 0 | −18 | −14 |
| A | 500 | −27 | −30 |
| 1 | 500 | −24 | −19 |
| 2 | 500 | −27 | −26 |
| 3 | 500 | −24 | −18 |
| A | 1000 | −34 | −33 |
| 1 | 1000 | −27 | −21 |
| 2 | 1000 | −34 | −30 |
| 3 | 1000 | −25 | −20 |

(1, 2, 3 = products of Examples 1, 2 and 3 respectively)

The above results show that the additives of the invention (1, 2 and 3) exhibited CFPP activity in the fuels tested and to an extent that was, in some cases, comparable to that of the known additive. The additives of the invention have the additional property of being octane improvers.

We claim:

1. A composition comprising a middle distillate fuel oil and from 0.001 to 5 wt. % (based on the oil) of an additive comprising a non metal-containing oil-soluble copolymer of number average molecular weight of from 200 to 50,000 having a polymethylene backbone or a polymethylene backbone interrupted by an O or an N atom or by a group containing an O or an N atom, the backbone being divided into segments by a plurality of side chains containing the same or different functional group selected from nitrate, peroxide, nitrite, hydroxyl, nitrosocarbonate and groups of the formula R—CO—O where R is hydrocarbyl of 1 to 28 carbon atoms.

2. The composition of claim 1 wherein the polymer is an ethylene polymer and the functional group is nitrate.

3. The composition of claim 1 wherein the polymer backbone carries groups of the formula R—CO—O—, where R is a hydrocarbyl group having from 1 to 28 carbon atoms.

* * * * *

UNITED STATES PATENT AND TRADEMARK OFFICE
CERTIFICATE OF CORRECTION

PATENT NO. : 5,456,730
DATED : October 10, 1995
INVENTOR(S) : Richard J. Hart et al.

It is certified that error appears in the above-indentified patent and that said Letters Patent is hereby corrected as shown below:

Column 14, line 32:

Claim 3 is deleted and replaced with the following claim 3:

--3. A method of operating a diesel engine which includes introducing to the engine as the fuel a composition comprising a major proportion of a middle distillate fuel and a minor proportion of a polymer as defined in claim 1.--

Signed and Sealed this

Twentieth Day of February, 1996

Attest:

BRUCE LEHMAN

Attesting Officer

Commissioner of Patents and Trademarks